F. R. PARKS.
POULTRY FEED TROUGH.
APPLICATION FILED JULY 20, 1910.
989,282.
Patented Apr. 11, 1911.
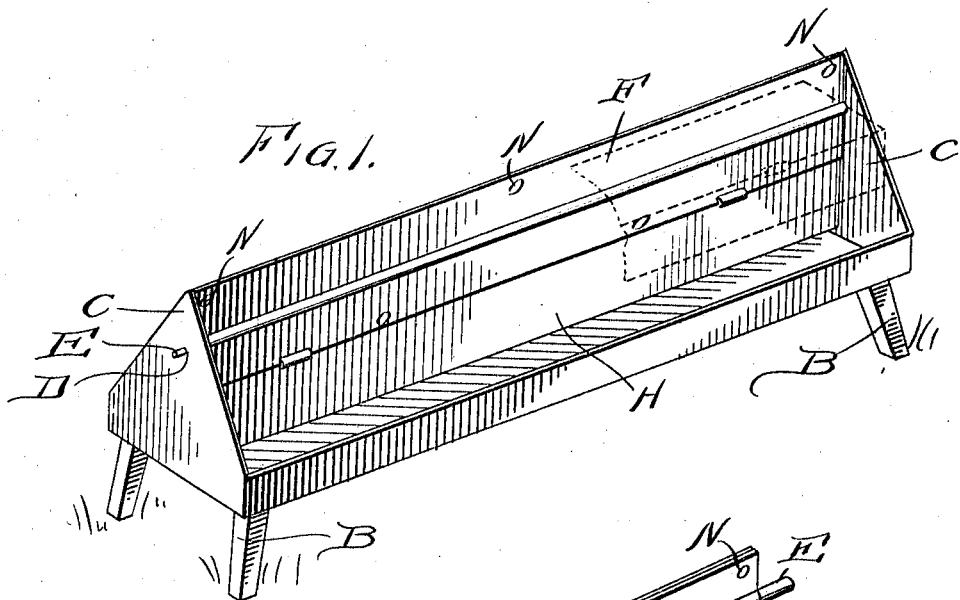
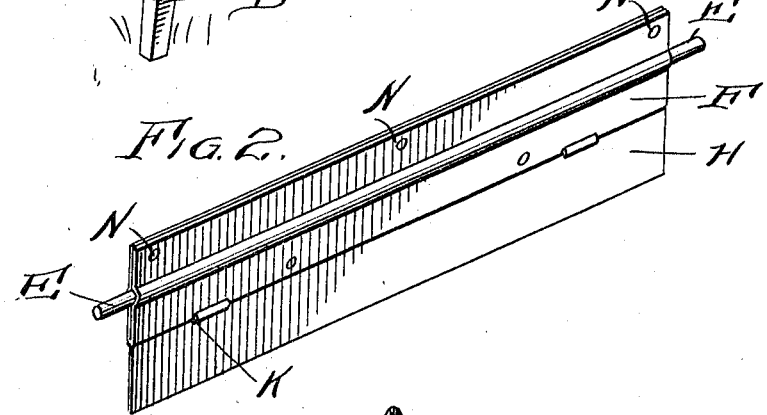
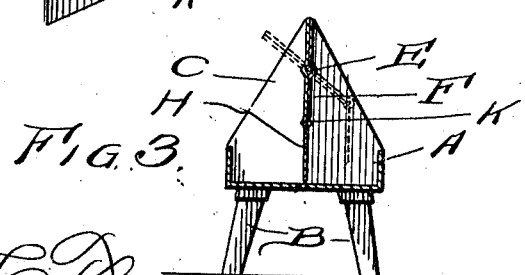

UNITED STATES PATENT OFFICE.

FREDERICK ROW. PARKS, OF HAMBURG, NEW YORK.

POULTRY FEED-TROUGH.

989,282.

Specification of Letters Patent. Patented Apr. 11, 1911.

Application filed July 20, 1910. Serial No. 572,920.

*To all whom it may concern:*

Be it known that I, FREDERICK R. PARKS, a citizen of the United States, residing at Hamburg, in the county of Erie and State of New York, have invented certain new and useful Improvements in Poultry Feed-Troughs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in poultry troughs, the object in view being to produce a simple and efficient device so arranged that the poultry will be prevented from alighting upon the trough.

My invention is illustrated in the accompanying drawings, in which:—

Figure 1 is a perspective view of a trough made in accordance with my invention. Fig. 2 is a detail view of a swivel plate mounted above the trough and adapted to rock with the weight of the fowl alighting thereon, and Fig. 3 is a detail sectional view through one end of the trough showing the manner of swivelly connecting the plate to the standard of the trough.

Reference now being had to the details of the drawings by letter, A designates a trough of any size or shape and preferably low in order that fowl may conveniently eat or drink therefrom and is mounted upon legs B. The ends C of the trough extend upward above the opposite marginal edges and are provided with apertures D.

F, F designate rectangular outlined plates or boards, each of which is provided with a longitudinal groove upon its inner face to receive the shaft E, said plates being fastened together by means of rivets or bolts N. The ends of the shaft E are journaled in said aperture D. Hinged to the lower edges of the plates F is a swinging flap H. Said plates or boards are so mounted as to normally be on edge and across the central portion longitudinally of the trough.

When the parts are adjusted in the manner shown, the operation of the device will be readily understood and is as follows: In the event of a fowl alighting upon the edge of the plates, the weight of the fowl will have a tendency to tilt or rock the plates, making it impossible for the fowl to perch thereon. After the fowl flies from the plates, they will return to their normal on edge positions.

What I claim to be new is:—

1. A poultry feeding trough having upright end portions, a shaft journaled in apertures therein, plates journaled upon said shaft, a flap hinged to the lower edges of said plates and adapted to hold the upper edges of the plates flush with the tops of the end portions of the trough.

2. A poultry feeding trough having upright end portions, a shaft journaled in apertures therein, plates, each having a longitudinal groove upon its inner face adapted to form bearing surfaces for said shaft upon which the plates are journaled, a flap hinged to the lower edges of said plates and adapted to hold the upper edges of the plates flush with the tops of the end portions of the trough.

In testimony whereof I hereunto affix my signature in the presence of two witnesses.

FREDDIE ROW. PARKS.

Witnesses:
- EMMA ANN PARKS,
- DANIEL MCCARTHY.